(12) United States Patent
Kocznar

(10) Patent No.: US 10,420,335 B2
(45) Date of Patent: Sep. 24, 2019

(54) APPARATUS TO DETER BIRDS AND ANIMALS FROM ROOSTING ON BOAT DECKS AND OTHER SURFACE AREAS

(71) Applicant: T&M CONSULTING GmbH, Salzburg (AT)

(72) Inventor: Wolfram Kocznar, Innsbruck (AT)

(73) Assignee: T&M Consulting GmbH, Salzburg (AT)

( * ) Notice: Subject to any disclaimer, the term of this patent is extended or adjusted under 35 U.S.C. 154(b) by 459 days.

(21) Appl. No.: 15/205,772

(22) Filed: Jul. 8, 2016

(65) Prior Publication Data
US 2017/0006854 A1    Jan. 12, 2017

(30) Foreign Application Priority Data

Jul. 10, 2015    (AT) .................................. A 455/2015

(51) Int. Cl.
*A01M 29/32*    (2011.01)
*B63B 17/00*    (2006.01)

(52) U.S. Cl.
CPC .............. *A01M 29/32* (2013.01); *B63B 17/00* (2013.01)

(58) Field of Classification Search
USPC .............. 119/713; 718/100; 702/33; 116/22; D22/120; 43/3, 2
See application file for complete search history.

(56) References Cited

U.S. PATENT DOCUMENTS

| 2,788,762 | A | * | 4/1957 | Wright | .................. | A01M 29/06 116/2 |
| 3,292,319 | A | * | 12/1966 | McCarthy | .............. | A01M 29/06 116/22 A |
| 3,295,240 | A | * | 1/1967 | Garte | ...................... | G09F 13/00 40/473 |
| 3,799,105 | A | * | 3/1974 | Porter | .................... | A01M 29/06 116/22 A |
| 5,875,373 | A | * | 2/1999 | Sato | ................... | G03G 15/2003 219/216 |
| 5,956,880 | A | * | 9/1999 | Sugimoto | .............. | A01M 29/06 116/22 A |
| 6,282,833 | B1 | * | 9/2001 | Dashefsky | .............. | A01M 5/00 43/125 |

(Continued)

FOREIGN PATENT DOCUMENTS

DE    102013011334 A1    1/2015

*Primary Examiner* — Andrea M Valenti
(74) *Attorney, Agent, or Firm* — Henry M. Feiereisen LLC

(57) ABSTRACT

Apparatus for deterring birds and animals from roosting on boat decks and other surface areas in form of a mechanical repeller includes a bracket for attachment to a surface area, and a housing including a quick-release fastening device to connect the housing with the bracket. The quick-release fastening device forms a pivotable bearing between the housing and the bracket. At least one pole extends from the housing and a bearing supports the housing in the bearing. An electric motor turns the housing and thereby moves the pole above the surface area. The electric motor includes an output shaft which engages the bracket axially detachable but torque proof. A rechargeable battery is provided and supplied with electric power from a solar cell. The housing is configured in form of a closed module which accommodates the solar cell, an electronic control unit, the electric motor, and the rechargeable battery.

7 Claims, 1 Drawing Sheet

(56) References Cited

U.S. PATENT DOCUMENTS

| | | | | |
|---|---|---|---|---|
| 6,351,908 | B1 * | 3/2002 | Thomas | A01M 29/06 116/22 A |
| 6,941,886 | B1 * | 9/2005 | Suelzer | B63B 17/00 114/343 |
| D534,236 | S * | 12/2006 | Zecher | D22/120 |
| 9,339,024 | B2 * | 5/2016 | Donoho | A01M 29/06 |
| 9,686,977 | B2 * | 6/2017 | Schauer | A01M 31/06 |
| 2004/0098898 | A1 * | 5/2004 | Nickerson | A01M 29/06 43/1 |
| 2007/0074467 | A1 * | 4/2007 | Zecher | A01M 29/32 52/101 |
| 2009/0229164 | A1 * | 9/2009 | Bradley | A01M 31/06 43/2 |

* cited by examiner

APPARATUS TO DETER BIRDS AND ANIMALS FROM ROOSTING ON BOAT DECKS AND OTHER SURFACE AREAS

CROSS-REFERENCES TO RELATED APPLICATIONS

This application claims the priority of Austrian Patent Application, Serial No. A455/2015, filed Jul. 10, 2015, pursuant to 35 U.S.C. 119(a)-(d), the disclosure of which is incorporated herein by reference in its entirety as if fully set forth herein.

BACKGROUND OF THE INVENTION

The present invention relates to an apparatus to deter birds and animals from roosting on boat decks and other surface areas.

The following discussion of related art is provided to assist the reader in understanding the advantages of the invention, and is not to be construed as an admission that this related art is prior art to this invention.

Problems arising with bird droppings are well known in cities and especially on the sea with boat decks. Attempts have been made with acoustic defenders. Most of these defenders use ultrasonic sound which is not effective (birds don't hear in the ultrasonic frequency range) and other animals like dogs are negatively affected from this sound. Boat owners often use ropes or wires spanned over deck to prevent birds from sitting down. Beside the fact that it takes a lot of time to apply these ropes after landing it takes the same amount of time to remove the wires and leave the harbor. Another approach involves flags which rotate by wind. If there are heavy wind conditions the flags may get damaged, and at calm wind conditions the flags do not work.

It would therefore be desirable and advantageous to address this problem and to obviate other prior art shortcomings.

SUMMARY OF THE INVENTION

According to one aspect of the present invention, an apparatus for deterring birds and animals from roosting on boat decks and other surface areas in form of a mechanical repeller, includes a bracket for attachment to a surface area, a housing including a quick-release fastening device to connect the housing with the bracket, the quick-release fastening device forming a pivotable bearing between the housing and the bracket, at least one pole extending from the housing, a bearing configured to support the housing in the bracket, an electric motor configured to turn the housing and thereby move the pole above the surface area, the electric motor including an output shaft configured to engage the bracket axially detachable but torque proof, an electronic control unit, a rechargeable battery, and a solar cell to supply electric power to the rechargeable battery, the housing configured in form of a closed module which accommodates the solar cell, the electronic control unit, the electric motor, and the rechargeable battery inside the housing.

A bird repeller according to the present invention can be rapidly engaged and disengaged from a boat and does not need any external cabling and power supply.

According to another advantageous feature of the present invention, the quick-release fastening device can include a collar which is formed on the housing, with the bracket including a bearing shaft of the pivot bearing.

According to another advantageous feature of the present invention, the electric motor includes a stator which can be fixed to a bottom of the housing, with the output shaft of the electric motor engaging torque proof and centrically in the bearing shaft.

According to another advantageous feature of the present invention, a flexible cord can be mounted to a free end of the pole as an extension. As a result, the working distance is enlarged.

According to another aspect of the present invention, a software program is provided to control the mechanical deterring apparatus which uses a solar cell to recharge a battery supplying electrical power to an electric control unit, detects the voltage provided from the solar cell as a threshold to switch from a day mode to a night mode, wherein the day mode initiates a higher moving activity and the night mode initiates a lower activity of the mechanical deterring device. Because birds are day active this helps to save energy especially in cloudy days.

According to still another aspect of the present invention, a software program is provided to control the mechanical deterring apparatus for birds which apparatus uses a solar cell to recharge a battery supplying electrical power to an electric control unit, measures the battery voltage and controls the mechanical movement depending on the battery voltage, by reducing the energy consumption of the mechanical device with lower battery voltage and increasing the energy consumption with higher battery voltage. This inventive program helps to reduce the risks in overloading the battery on sunny days and vice versa to prevent a low discharge of the battery in cloudy days.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
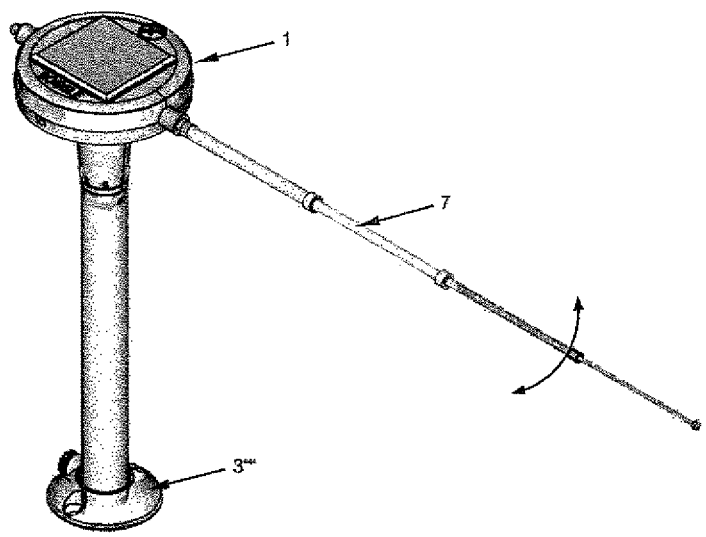
FIG. 1 shows an axiometric view of a repelling apparatus according to the present invention for attachment on a surface (not shown)

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an axiometric view of a repelling apparatus according to the present invention for attachment on a surface. The repelling apparatus includes a bracket 3 having a sleeve 3''' which is screwed down to the boat's deck (not shown), and a pivotable housing 1 which carries a telescopic pole 7. By turning the housing 1, the pole describes a circle and chases any bird in the vicinity. It is not necessary and not useful for the turning to be permanent. In lieu thereof, the housing 1 shall be turned intermittently to save energy and create a surprising effect to animals as later described. If the boat shall be used, the housing 1 can easily be removed by pulling it from the bracket 3. Vice versa after landing the boat, the housing 1 may be reconnected to the bracket 3 without the need of any reinstallation of cables, supplies, and so forth.

Figure 2:
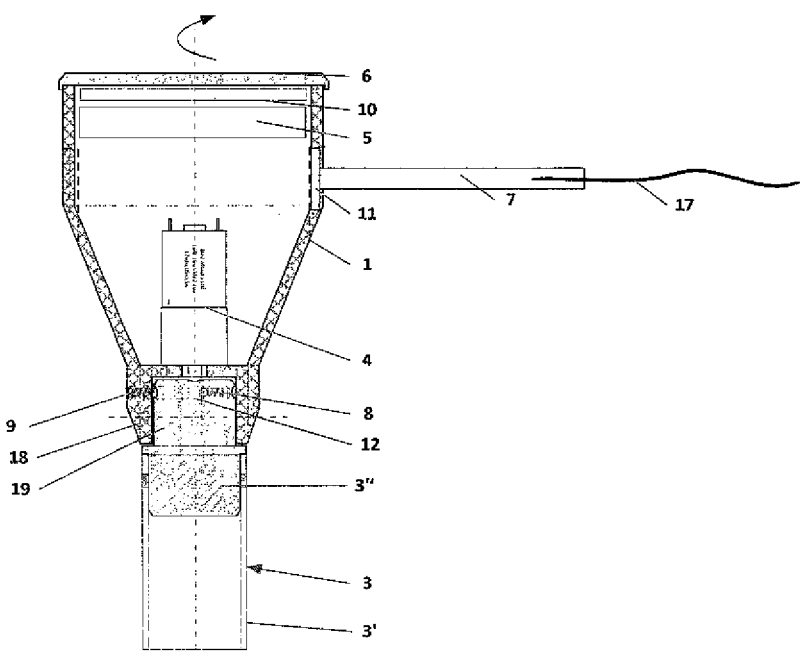
FIG. 2 shows a schematic cross section, on an enlarged scale, of an upper area of the repelling apparatus of FIG. 1.

FIG. 2 shows a cross section of the cup-shaped lower part of the housing 1 closed by a cover 6 on top. Under the transparent cover 6 a solar cell 10 is situated and thereafter an electronic control unit 5. Protruding from the housing is a telescopic pole 7 and the free end of the pole 7 is elongated by a rope 17.

At the lower end of the housing 1, a quick-release fastening device 8, 9, 18, 19 is situated to connect the housing 1 with the bracket 3. The bracket 3 includes a sleeve 3''' to be screwed down on the boat's deck (not shown). The sleeve 3" carries a tube 3 and a plug 3" on an upper end. The plug 3" forms on one end thereof a shaft 19 of a Divot bearing for the housing 1. The second part of this Divot bearing—the collar 18—is built on the lower end of the housing 1 and allows the housing to be turned relative to the bracket 3. The collar 18 has a radially acting compression spring 9 which engages in a groove of the shaft 19. The housing 1 can thus be withdrawn axially from the shaft 19 against the holding force of the compression spring 9 or mounted again.

On the bottom of the housing 1, an electric motor 4 is mounted with the output shaft 12 protruding into the shaft 19 of plug 3". This output shaft 12 engages axially detachably into the shaft 19 of plug 3" of the bracket 3, fixed against rotation in a torque proof manner by being clamped by a set screw 8.

By powering the motor 4 the housing pivots relative to the bracket 3 and the pole 7 describes a circuit. The whole unit (housing 1, pole 7, solar cell 10, electronic control unit 5 and motor 4) can be easily detached (boat usage) and attached (boat storage) from/to the bracket 3. No wiring and power supply is required.

Figure 3:
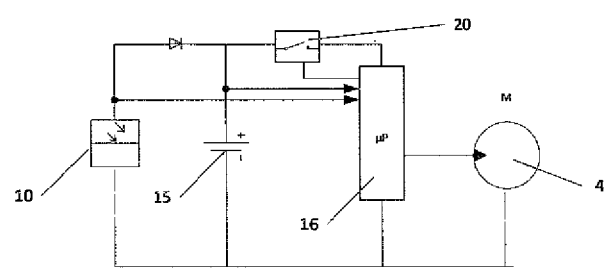
FIG. 3 is a schematic wiring diagram of a control unit of the repeller apparatus.

FIG. 3 shows a schematic wiring of the electronic control unit 5. A solar cell 10 is connected via a diode to a backup-battery 15 charging the battery 15 whenever sunlight is available. The solar cell 10 would not be able to provide enough energy to the electric motor 4 but the battery 15 complements the required amperage.

A microprocessor 16 controls the movement by intermittently switching the motor 4 on and off. The on time and the pause time are dimensioned that in normal sunlight conditions the energy delivered by the solar cell 10 is equal to the power consumption. The microprocessor 16 comprises a sensing input for the solar voltage and the software program switches—depending from day and night conditions—between a day mode with more activity and a night mode with less or no activity.

An additional sensing input for the battery voltage allows the microprocessor 16 to detect the charging status of the battery 15. If the voltage drops the pause time will be extended and if the voltage rises the pause times will be shortened. Therefore, this control unit 5 adapts automatically to sunlight conditions and prevents damaging the battery by overload or low discharge.

The apparatus according to the invention can be put into operation within seconds and prevents bird droppings for any period of time and without negative impact to animals or environment.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. Apparatus for deterring birds and animals from roosting on boat decks and other surface areas in form of a mechanical repeller, said apparatus comprising:
   a bracket comprising a tube, a plug axially insertable into the tube on one end and forming a shaft on another end of the plug, and a sleeve for attachment of the bracket to a surface area;
   a housing including a quick-release fastening device to connect the housing with the bracket, said quick-release fastening device forming a pivotable bearing between the housing and the bracket;
   at least one pole extending from the housing;
   an electric motor configured to turn the housing and thereby move the pole above the surface area, said electric motor including an axially detachable output shaft configured to engage the bracket by protruding centrically into the shaft of the plum and fixed to the shaft of the plug to prevent rotation of the bracket and to allow rotation of the housing and the at least one pole;
   an electronic control unit;
   a rechargeable battery; and
   a solar cell to supply electric power to the rechargeable battery,
   said housing configured in form of a closed module which accommodates the solar cell, the electronic control unit, the electric motor, and the rechargeable battery inside said housing.

2. The apparatus of claim 1, wherein the quick-release fastening device includes a collar which is formed on a lower end of the housing, said collar configured to allow the housing to be turned relative to the bracket.

3. The apparatus of claim 1, wherein the electric motor includes a stator which is fixed to a bottom of the housing.

4. The apparatus of claim 1, further comprising a flexible cord mounted to a free end of the pole as an extension.

5. The apparatus of claim 1, further comprising a processor, wherein the processor controls the mechanical repeller which uses the solar cell to recharge the battery supplying electrical power to the electric control unit, and detects a voltage provided from the solar cell as a threshold to switch from a day mode to a night mode, with the day mode initiating a higher moving activity and the night mode initiating a lower activity of the mechanical repeller.

6. The apparatus of claim 1, further comprising a processor, wherein the processor controls the mechanical repeller which uses the solar cell to recharge the battery supplying electrical power to the electric control unit, measures a battery voltage, and controls movement of the mechanical repeller depending on the battery voltage, by reducing an energy consumption of the mechanical repeller with lower battery voltage and increasing the energy consumption with higher battery voltage.

7. The apparatus of claim 1, wherein the output shaft is fixed to the shaft of the plug by a screw.

\* \* \* \* \*